(12) United States Patent
Xie et al.

(10) Patent No.: US 11,347,758 B2
(45) Date of Patent: *May 31, 2022

(54) METHOD AND APPARATUS FOR PROCESSING SEARCH DATA

(71) Applicant: Alibaba Group Holding Limited, Grand Cayman (KY)

(72) Inventors: Pengjun Xie, Hangzhou (CN); Xin Zhou, Hangzhou (CN); Jun Lang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 143 days.

This patent is subject to a terminal disclaimer.

(21) Appl. No.: 16/822,431

(22) Filed: Mar. 18, 2020

(65) Prior Publication Data

US 2020/0226142 A1  Jul. 16, 2020

Related U.S. Application Data

(63) Continuation of application No. 15/538,727, filed as application No. PCT/CN2015/097481 on Dec. 15, 2015, now Pat. No. 10,635,678.

(30) Foreign Application Priority Data

Dec. 23, 2014 (CN) .......................... 201410836116.9

(51) Int. Cl.
 *G06F 16/2457* (2019.01)
 *G06F 16/9535* (2019.01)

(52) U.S. Cl.
 CPC .... *G06F 16/24578* (2019.01); *G06F 16/9535* (2019.01)

(58) Field of Classification Search
 CPC ...................... G06F 16/24578; G06F 16/9535
 (Continued)

(56) References Cited

U.S. PATENT DOCUMENTS 8,037,063 B2  10/2011  Oldham et al.
8,150,859 B2   4/2012  Vadlamani et al.
(Continued)

FOREIGN PATENT DOCUMENTS

CN  103218719 A  7/2013
CN  103229223 A  7/2013
(Continued)

OTHER PUBLICATIONS

Agarwal, Arvind et al., "Learning to Rank for Robust Question Answering," CIKM '12, Maui, HI, Oct. 29-Nov. 2, 2012, pp. 833-842.

(Continued)

*Primary Examiner* — Robert Stevens
(74) *Attorney, Agent, or Firm* — James J. DeCarlo; Greenberg Traurig, LLP

(57) ABSTRACT

The disclosure provides a method and apparatus for processing search data. For a historical search query that includes a knowledge requirement, the disclosure mines entity information for the historical search query and uses that as an answer recommended to users. Thus, the accuracy of entity information recommended to users is improved, and the current problem of poor search results for a historical search query that includes a knowledge requirement is solved.

17 Claims, 12 Drawing Sheets

(58) Field of Classification Search
USPC .......................................................... 707/730
See application file for complete search history.

(56) References Cited

U.S. PATENT DOCUMENTS

| | | |
|---|---|---|
| 8,346,701 B2 | 1/2013 | Wang et al. |
| 8,478,737 B2 | 7/2013 | Klinkner et al. |
| 8,620,951 B1 | 12/2013 | He et al. |
| 8,725,717 B2 | 5/2014 | Bernstein et al. |
| 8,732,198 B2 | 5/2014 | Chetuparambil et al. |
| 9,098,600 B2 | 8/2015 | Chetuparambil et al. |
| 9,129,020 B2 | 9/2015 | Buchmueller et al. |
| 9,213,748 B1 | 12/2015 | Matias et al. |
| 9,251,262 B1 | 2/2016 | Bunn et al. |
| 9,336,269 B1 | 5/2016 | Smith et al. |
| 9,378,240 B2 | 6/2016 | Jason |
| 2003/0217052 A1 | 11/2003 | Rubenczyk et al. |
| 2005/0289140 A1 | 12/2005 | Ford et al. |
| 2007/0027856 A1 | 2/2007 | Lee |
| 2007/0050332 A1 | 3/2007 | Grenzberg et al. |
| 2010/0198837 A1 | 8/2010 | Wu et al. |
| 2010/0228711 A1 | 9/2010 | Li et al. |
| 2011/0106746 A1 | 5/2011 | Ventilla et al. |
| 2011/0264651 A1 | 10/2011 | Selvaraj et al. |
| 2012/0005219 A1 | 1/2012 | Apacible et al. |
| 2012/0221564 A1 | 8/2012 | Jones et al. |
| 2013/0173604 A1 | 7/2013 | Li et al. |
| 2014/0172846 A1* | 6/2014 | Jones ................. G06Q 30/0241 707/728 |
| 2014/0188934 A1 | 7/2014 | Datta |
| 2014/0272884 A1 | 9/2014 | Allen et al. |
| 2014/0289211 A1 | 9/2014 | Cao et al. |
| 2015/0302012 A1 | 10/2015 | Bhagat |
| 2015/0339752 A1 | 11/2015 | Chetuparambil et al. |

FOREIGN PATENT DOCUMENTS

| | | |
|---|---|---|
| CN | 103279486 A | 9/2013 |
| CN | 103455535 A | 12/2013 |

OTHER PUBLICATIONS

Bian, Jiang et al., "Finding the Right Facts in the Crowd: Factoid Question Answering over Social Media," WWW 2008, Beijing, China, Apr. 21-25, 2008, pp. 467-476.

Brocolo, Daniele, "Query Log Based Techniques to Improve the Performance of a Web Search Engine," Ph.D. Thesis, CA' Forscai University of Venice, Dept. of Informatics, Nov. 2013, 137 pages.

Burel, Gregoire et al., "Automatic Identification of Best Answers in Online Enquiry Communities," ESWC 2012, LNCS 7295, Pringer-Verlag, Berlin, Germany, 2012, pp. 514-529.

Hieber, Felix et al., "Improved Answer Ranking in Social Question-Answering Portals," SMUC '11, Glasgow, Scotland, Oct. 28, 2011, pp. 19-25.

International Search Report from corresponding International Application No. PCT/CN2015/097481 dated Feb. 29, 2016 (2 pages).

Jeon, Jiwoon, et al., "Finding Similar Questions in Large Question and Answer Archives," CIKM '05, Bremen, Germany, Oct. 31-Nov. 5, 2005, pp. 84-90.

Qu, Bo et al., "An Evaluation of Classification Models for Question Topic Categorization," Journal of the American Society for Information Science and Technology, vol. 63, issue 5, 2012, pp. 889-903.

* cited by examiner

METHOD AND APPARATUS FOR PROCESSING SEARCH DATA

CROSS-REFERENCE TO RELATED APPLICATIONS

This application is a continuation of, and claims the benefit of priority of, U.S. application Ser. No. 15/538,727 filed on Jun. 22, 2017 titled "Method and Apparatus for Processing Search Data" which claims priority to Chinese Patent Application No. 201410836116.9, filed on Dec. 23, 2014 and PCT Application No. PCT/CN2015/097481, filed on Dec. 15, 2015, all of which are incorporated herein in their entirety by reference.

BACKGROUND

Technical Field

The disclosure relates to the fields of communications and computers, and specifically, to a method and apparatus for processing search data.

Description of the Related Art

With e-commerce applications becoming increasingly popular, online shopping has been gradually integrated into users' daily life. Searching online becomes a customary shopping starting point for many users. Users may input a variety of search queries that interest them in a search box. Upon receiving a search query from a user, shopping websites usually provide relevant shopping guide information to help users in making purchase decisions. Two common shopping guide methods (navigation and related search) for search result pages are described below.

1. Navigation

A navigation area enables a user to decide on a to-be-purchased commodity step by step via screening. This has been an effective way in helping users make their purchase decisions. For example, as seen in the Patent Application Publication No. CN103218719A entitled "Method and System for E-Commerce Web site Navigation," a category (or property) most related to the searched content is provided by extracting the precise navigational clicks of categories and navigation frequencies of commodity categories as well as by taking into account historical factors such as clicks and purchased commodities that correspond to a query keyword, commodity quantity information relevant to a search term, etc. With this type of navigation, users are assisted in clarifying and making their purchase decisions.

2. Related Search

"Related search" refers to a refined query that is either similar or otherwise relevant to users' initial input query and is provided for users for redirecting a search. In the Patent Application Publication No. CN103279486A entitled "Method and Device for Providing Related Searches," a recommended query is provided to users as follows: other queries appearing in the same session with the current query are considered as the current query's recommendation candidates; the recommendation candidates are then clustered based on their semantic similarity to the input query to generate recommendation candidate clusters. During online recommendation, a query is finally recommended to the user according to the searching frequencies of each candidate in the cluster.

Both the existing solutions, navigation and related search, can provide adequate shopping guide information to users when a query is simple and specific. However, neither navigation nor related search can be of great help to users in making their purchase decisions when a query includes a knowledge requirement.

1. Defects of Navigation

The essence of current navigation techniques (e.g., commodity navigation) is as follows: retrieve a result (e.g., a commodity) in response to a queried keyword; calculate the importance of different CPVs (category, property, value of property) according to users' click feedback on a retrieved result (e.g., the CPV of a set of commodities); and make a recommendation to users based on the calculated importance. The disadvantage of this method is its absolute dependence on the retrieved results set (e.g., commodities) and categorical properties of the results (e.g., commodities). The shopping guide information provided in the navigation area becomes less informative when the length of a query that includes a knowledge requirement is longer and results in fewer retrieved results (e.g., commodities) or when the categorical properties of the results (e.g., commodities) are too general. For example, as shown in FIG. 1, a query using 'a present for boyfriend' as the knowledge requirement results in retrieved commodities having broad categorical properties. In addition, as shown in FIG. 2, a query using 'what are local products of Hangzhou' as a knowledge requirement results in fewer commodities being retrieved. Therefore, information provided in the shopping guide in the navigation areas is less informative.

2. Defects of Related Search

Recommendation candidates of a related search come from the query input by users and are therefore limited by the users' knowledge. As shown in FIG. 3, when a query input that includes a knowledge requirement is searched for (e.g., "a present for boyfriend"), related search offers users similar queries to the query input but us unable to meet the users' needs in finding an answer.

BRIEF SUMMARY

An objective of the disclosure is to provide a method and apparatus for processing search data. For a historical search query that includes a knowledge requirement, the method and apparatus can mine entity information for the historical search query to serve as an answer recommended to a user. Therefore, the accuracy of entity information recommended to users is improved, and the current problem of a poor search result for a historical search query that includes a knowledge requirement, e.g., the problem of less informative shopping guide information is solved.

Therefore, the disclosure provides a method for processing search data, including: acquiring search result information corresponding to a plurality of historical search queries including a knowledge requirement; extracting, from the search result information, candidate entity information corresponding to the plurality of historical search queries; and determining, according to the candidate entity information, entity information corresponding to each historical search query.

Further, the extracting, from the search result information, candidate entity information from a historical search query comprises: determining, according to a type of a corresponding historical search query, a method of extracting the candidate entity information from the corresponding historical search query; and extracting, according to the determined method, the candidate entity information from the search result information associated with the corresponding historical search query.

Further, determining, according to the candidate entity information, entity information corresponding to each historical search query comprises: identifying all candidate entity information corresponding to each historical search query as the entity information corresponding to a corresponding historical search query.

Further, in one embodiment the search result information comprises: text content, a website, a number of supporters, and a number of opponents of an answer corresponding to a historical search query.

Further, extracting, from the search result information, candidate entity information corresponding to the plurality of historical search queries comprises: extracting candidate entity information corresponding to a historical search query from text content of answers corresponding to the historical search query.

Further, determining, according to the candidate entity information, entity information corresponding to each historical search query includes: screening the candidate entity information corresponding to a historical search query and selecting entity information corresponding to the historical search query.

Further, after extracting, from the search result information, candidate entity information corresponding to the plurality of historical search queries, the method further includes: calculating a score for the candidate entity information.

Further, in one embodiment, the score for the candidate entity information corresponding to a historical search query is calculated according to the following formula:

$$score_{entity1} = \sum_{i=1}^{m} \sum_{j=1}^{n} E_{ij} * Weight1_i * Weight2_j,$$

wherein entity1 denotes an entity word, m denotes a total number of websites, i denotes a selected website of the m websites, n denotes a total number of answers of a website i,j denotes an answer of the n answers, $E_{ij}$ denotes whether entity1 appears in the answer j of the website i, wherein $E_{ij}$ is equal to 1 if entity1 appears in the answer j and $E_{ij}$ is equal to 0 if entity 1 is absent in the answer j, $Weight1_i$ denotes a weight of the website i, and $Weight2_j$ denotes a weight of the answer j, wherein a value of the $Weight2_j$ is determined by a number of supporters and a number of opponents of the answer j and $Weight2_j$ is a positive integer greater than or equal to 1 having a default value of 1.

Further, screening the candidate entity information corresponding to a historical search query and selecting entity information corresponding to the historical search query comprises: selecting entity information corresponding to a historical search query from the candidate entity information corresponding to the historical search query according to the score for each piece of candidate entity information.

Further, after screening the candidate entity information corresponding to a historical search query and selecting entity information corresponding to the historical search query, the method further includes: obtaining, according to the score for each piece of candidate entity information, a score for the corresponding entity information.

Further, after determining, according to the candidate entity information, entity information corresponding to each historical search query, the method further includes: identifying a corresponding historical search query according to a current search query comprising a knowledge requirement; and acquiring entity information corresponding to the corresponding historical search query.

Further, after acquiring entity information corresponding to the corresponding historical search query, the method further includes: acquiring a score for the entity information corresponding to the corresponding historical search query, and ranking the entity information according to scores of each piece of entity information associated with the corresponding historical search query.

In another aspect, the disclosure further provides an apparatus for processing search data, including: a first device, configured to acquire search result information corresponding to a plurality of historical search queries including a knowledge requirement; a second device, configured to extract, from the search result information, candidate entity information corresponding to the plurality of historical search queries; and a third device, configured to determine, according to the candidate entity information, entity information corresponding to each historical search query.

Further, the second device includes: a first unit, configured to determine, according to a type of a corresponding historical search query, a method of extracting the candidate entity information from the corresponding historical search query; and a second unit, configured to extract, according to the determined method, the candidate entity information from the search result information associated with the corresponding historical search query.

Further, the third device is configured to identify all candidate entity information corresponding to each historical search query as the entity information corresponding to a corresponding historical search query.

Further, in one embodiment, the search result information, acquired by the first device comprises text content, a website, a number of supporters, and a number of opponents of an answer corresponding to a historical search query.

Further, the second device extracts, candidate entity information corresponding to a historical search query from text content of answers corresponding to the historical search query.

Further, the third device screens the candidate entity information corresponding to a historical search query and selects entity information corresponding to the historical search query.

Further, the apparatus further includes a fourth device, configured to calculate a score for the candidate entity information.

Further, the fourth device calculates the score for the candidate entity information corresponding to a historical search query according to the following formula:

$$score_{entity1} = \sum_{i=1}^{m} \sum_{j=1}^{n} E_{ij} * Weight1_i * Weight2_j,$$

wherein entity1 denotes an entity word, m denotes a total number of websites, i denotes a selected website of the m websites, n denotes a total number of answers of a website i,j denotes an answer of the n answers, $E_{ij}$ denotes whether entity1 appears in the answer j of the website i, wherein $E_{ij}$ is equal to 1 if entity1 appears in the answer j and $E_{ij}$ is equal to 0 if entity 1 is absent in the answer j, $Weight1_i$ denotes a weight of the website i, and $Weight2_j$ denotes a weight of the answer j, wherein a value of the $Weight2_j$ is determined by a number of supporters and a number of opponents of the answer j and Weight2$_j$ is a positive integer greater than or equal to 1 having a default value of 1.

Further, the third device is configured to screen the candidate entity information corresponding to each historical search query and select entity information corresponding to each historical search query according to the score for each piece of candidate entity information.

Further, the third device is further configured to obtain, according to the score for each piece of candidate entity information, a score for the corresponding entity information.

Further, the apparatus further includes: a fifth device, configured to identify a corresponding historical search query according to a current search query comprising a knowledge requirement; and a sixth device, configured to acquire entity information corresponding to the corresponding historical search query.

Further, the sixth device is further configured to acquire a score for the entity information corresponding to the corresponding historical search query, and ranking the entity information according to scores of each piece of entity information associated with the corresponding historical search query.

Compared with current techniques, for a historical search query that includes a knowledge requirement, the disclosure can mine entity information for the historical search query and uses that as an answer recommended to users. Therefore, the accuracy of entity information recommended to users is improved, and the current problem of a poor search results for a historical search query that includes a knowledge requirement is solved.

Further, the disclosure screens candidate entity information corresponding to each historical search query and selects entity information corresponding to the historical search query. Thus, inaccurate or less accurate candidate entity information is deleted; and accurate candidate entity information is selected via screening and serves as entity information. Further optimized and more accurate entity information may therefore be obtained and provided to users.

Further, the disclosure calculates scores for candidate entity information corresponding to each historical search query. The scores are used for further screening and selecting entity information from the candidate entity information. Alternatively, the disclosure ranks selected entity information and then provides the entity information to users, thereby providing a more accurate recommendation result.

BRIEF DESCRIPTION OF THE DRAWINGS

Other features, objectives, and advantages of the disclosure will become more apparent from detailed description of non-restrictive embodiments made with reference to the following accompanying drawings.

The same or similar reference numerals in the accompanying drawings represent the same or similar components.

DETAILED DESCRIPTION

In a typical configuration of the disclosed embodiments, a terminal, a device of a service network, and a trusted party each includes one or more processors (CPUs), input/output interfaces, network interfaces, and memories.

The memory may include computer readable medium in the form of non-permanent memory, random access memory (RAM) and/or non-volatile memory or the like; examples include a read-only memory (ROM) or a flash memory (flash RAM). The memory is an example of a computer readable medium.

The computer readable medium includes permanent and non-permanent, movable and non-movable media that can achieve information storage by means of any methods or techniques. Information may be a computer readable instruction, a data structure, a module of a program, or other data. For example, a storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission medium, used to store information accessible to the computing device. According to the definition of this text, the computer readable medium does not include non-transitory media, such as a modulated data signal and a carrier.

Figure 1:
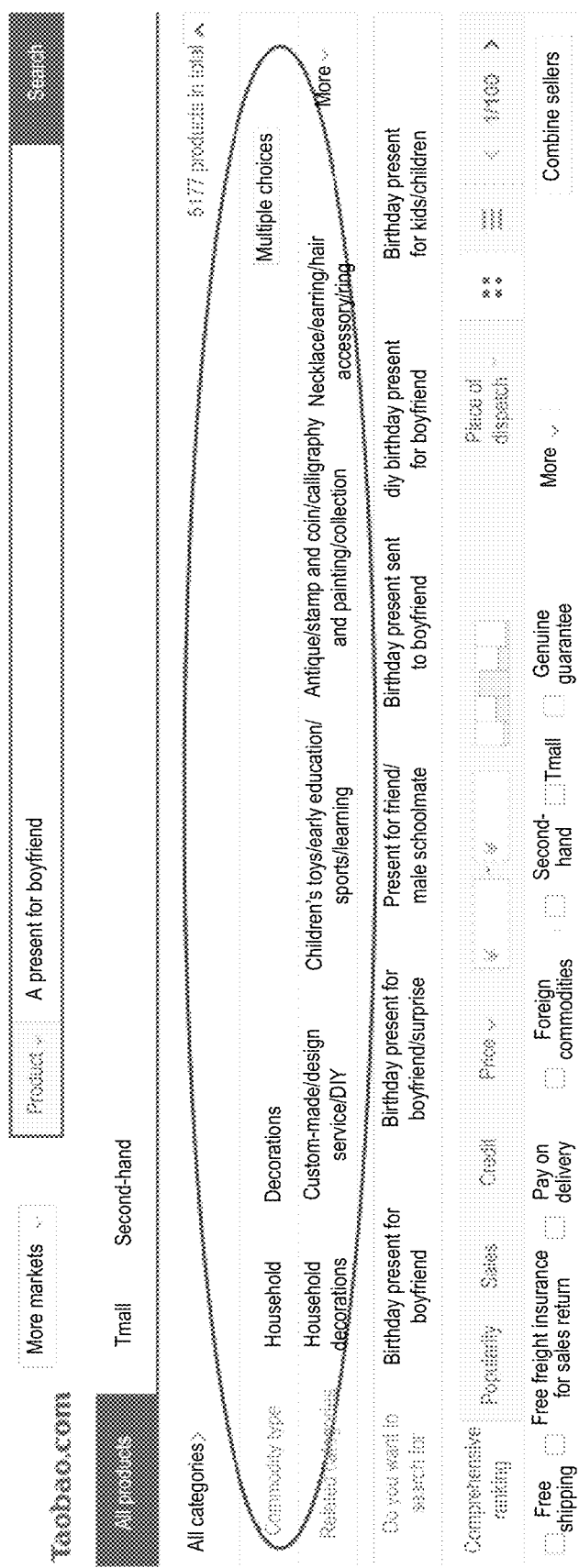
FIG. 1 is a search result diagram of an existing navigation system.
Figure 2:
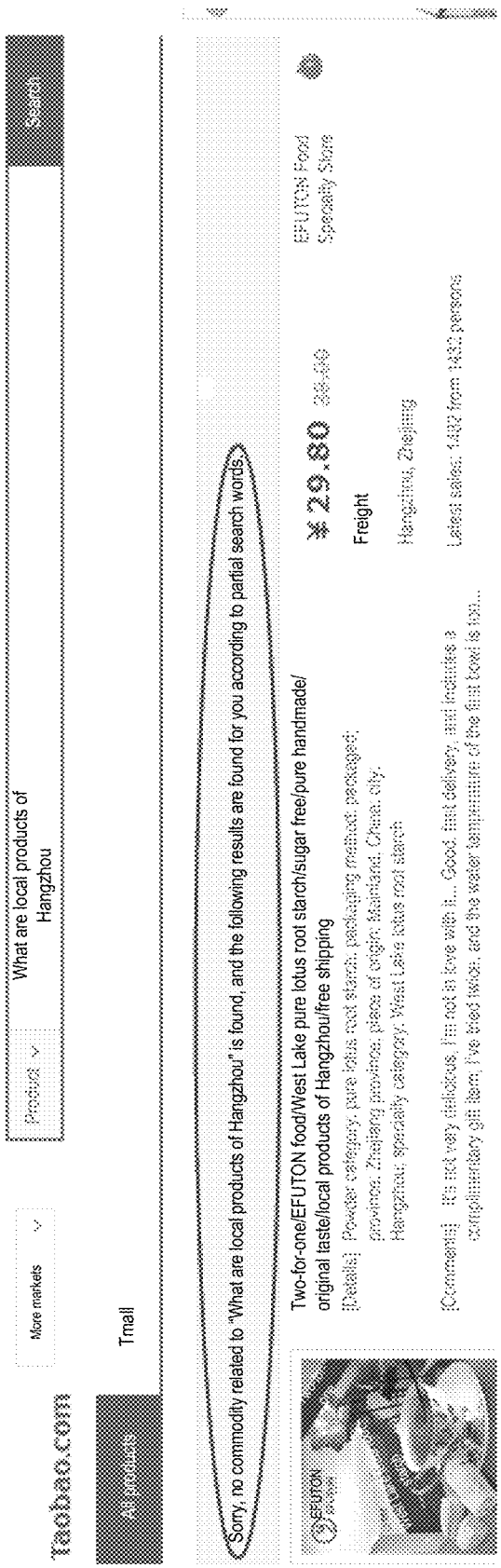
FIG. 2 is a search result diagram of the existing navigation system.
Figure 3:
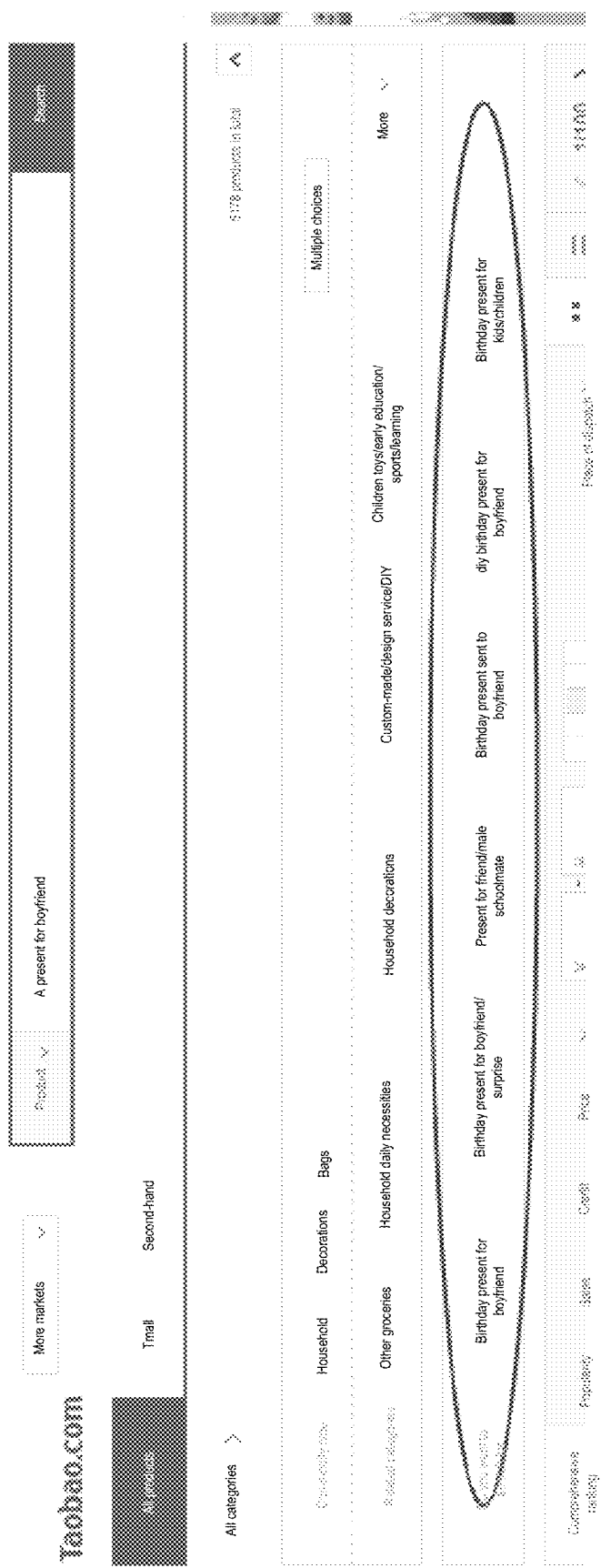
FIG. 3 is a search result diagram of an existing related search system.
Figure 4:
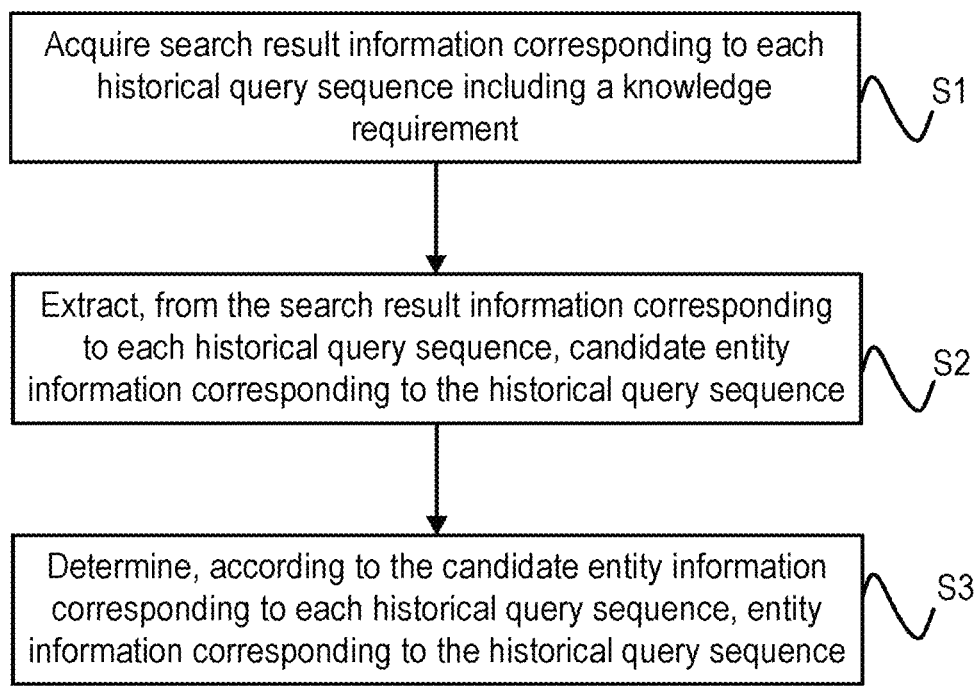
FIG. 4 is a flow diagram of a method for processing search data according to one embodiment of the disclosure.

As shown in FIG. 4, the disclosure provides a method for processing search data, including the following steps.

Step S1: Acquire search result information corresponding to each historical search query that includes a knowledge requirement.

Step S2: Extract, from the search result information corresponding to each historical search query, candidate entity information corresponding to the historical search query.

Step S3: Determine, according to the candidate entity information corresponding to each historical search query, entity information corresponding to the historical search query.

Specifically, for a historical search query that includes a knowledge requirement, the disclosed embodiments can mine entity information for the historical search query and use the entity information as an answer recommended to users, thus improving the accuracy of the recommended entity information, and solving the current problem of poor search results for a historical search query that includes a knowledge requirement. The disclosed embodiments can employ an information extraction method in which a historical query that includes a knowledge requirement is identified first; then search result information related to the historical query including the knowledge requirement is extracted from global community data; and desired entity information is mined from the search result information to serve as an answer stored in a knowledge base. Therefore, when a user conducts an online search for a corresponding historical search query according to a current search query that includes a knowledge requirement, entity information corresponding to the found historical search query may be recommended to users based on the knowledge base.

Figure 5:
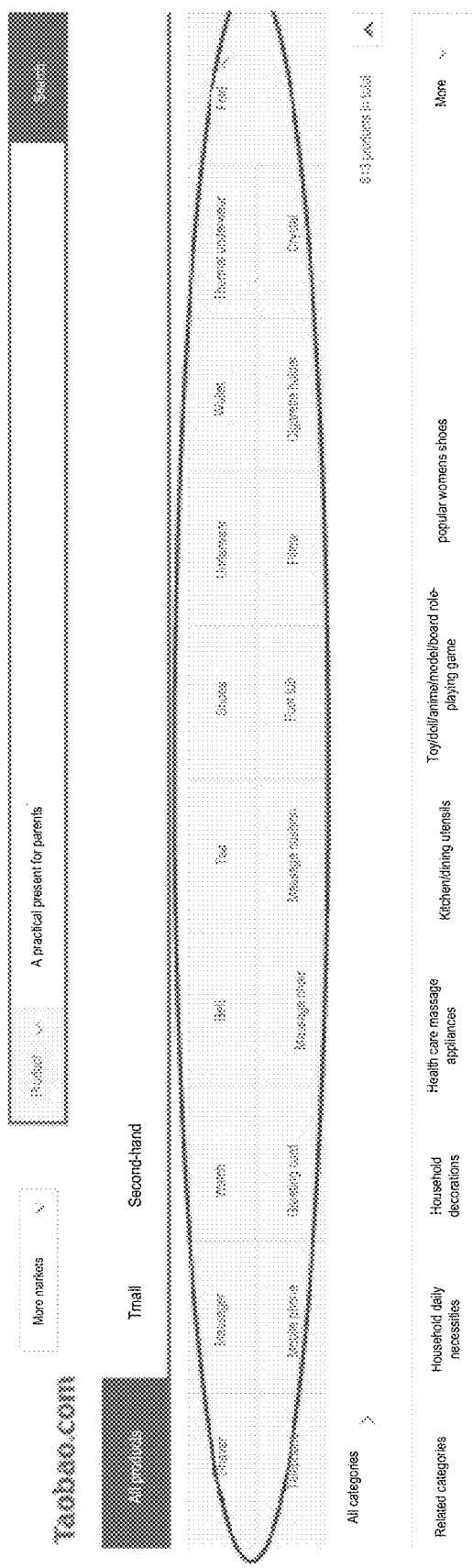
FIG. 5 is a search result user interface according to one embodiment of the disclosure.
Figure 6:
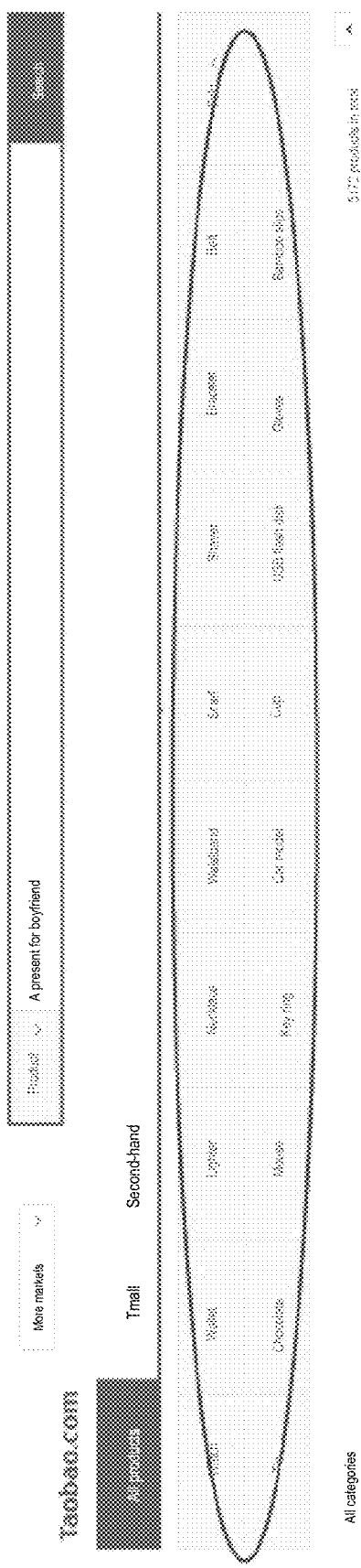
FIG. 6 is a search result user interface according to one embodiment of the disclosure.

As used herein, "entity information" may include information about objects existing physically that can be distinguished from one another. Alternatively, or in conjunction with the foregoing, the entity information may be information about a specific person, event, and object or about a concept or relation between items. Using a shopping application as an example, a historical search query that includes a knowledge requirement may include a shopping query for information, such as "a practical present for parents" in FIG. 5 or "a present for boyfriend" in FIG. 6. Through the method of the disclosed embodiments, entity information may be mined from community data of a web site to serve as an answer recommended to users. Thus, the accuracy of the entity information recommended to users is improved, such that the entity information obtained accordingly is recommended commodities tailor-made for users, thereby solving the problem that the current shopping query that includes a knowledge requirement has poor shopping guide information.

In another example, users can obtain entity information of N levels in sequence, wherein N is a positive integer, and the next-level entity information is obtained depending on the previous-level entity information. For example, entity information obtained for the corresponding first (N−1) levels may be new historical search queries that include a knowledge requirement. In this way, entity information of the next level is obtained according to the previous-level historical search query. In addition to the $N^{th}$-level entity information, the next-level entity information can also be a historical search query. The further next-level entity information is obtained according to the next-level entity information, and so on, until a piece of specific entity information of the $N^{th}$ level (e.g., specific commodity information) is obtained according to the entity information of the $(N-1)^{th}$ level (which, at this point, is a historical search query). The entity information obtained corresponding to the first (N−1) levels may be presented to users in a form of multi-level recommendation labels. When the user clicks on a recommendation label for a certain level, the user may be redirected to the next-level recommendation label until the specific entity information of the final $N^{th}$ level is obtained, such as the specific commodity information. Through this step-by-step redirecting method, the user may be guided to obtain desired and specific entity information. Those skilled in the art should be able to understand that the aforementioned descriptions of specific application scenarios are merely examples. Other existing application scenarios or those that may appear in the future, if applicable to the disclosed embodiments, also fall within the scope of the disclosed embodiments.

Figure 7:
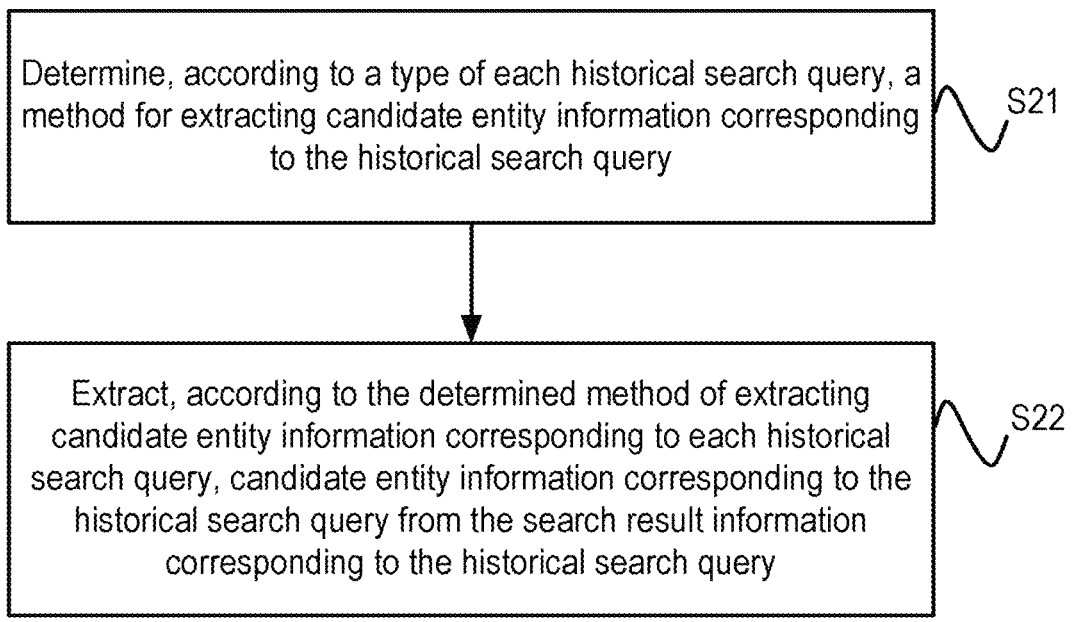
FIG. 7 is a flow diagram of a method for processing search data according to one embodiment of the disclosure.

FIG. 7 is a flow diagram of a method for processing search data according to one embodiment of the disclosure. Specifically, FIG. 7 illustrates additional substeps performed in step S2 of FIG. 4.

Step S21: Determine, according to a type of each historical search query, a method for extracting candidate entity information corresponding to the historical search query.

Step S22: Extract, according to the determined method of extracting candidate entity information corresponding to each historical search query, candidate entity information corresponding to the historical search query from the search result information corresponding to the historical search query.

In one embodiment, prior to step S21, all historical search queries may be analyzed and summarized to extract different types of historical search queries that include knowledge requirements. Then, in step S21, it is determined, according to a type of each historical search query, a method of extracting candidate entity information corresponding to the historical search query. For example, the types of the historical search queries including knowledge requirements may be classified into the following sets of n-grams and patterns:

(1) place name+"local products": indicates that the user desired to acquire knowledge about local products for a specific location.
(2) "give" +title+"present": indicates that the user hoped to acquire shopping guide knowledge about giving presents.
(3) category word+"brand": indicates that the user hoped to acquire the best-selling brand of a category.
(4) category word+"accessory": indicates that the user hoped to acquire other accessories of a category.

For the historical search query of place name+"local product", it can be determined that the method of extracting candidate entity information corresponding to this type of historical search query is to extract names of local products to serve as entity information. For the historical search query of "give" +title+"present", it is determined that the method of extracting candidate entity information corresponding to this type of historical search query is to extract present names as entity information. For the historical search query of category word+"brand", it can be determined that the method of extracting candidate entity information corresponding to this type of historical search query is to extract brand names as entity information. For the historical search query of category word+"accessory", it can be determined that the method of extracting candidate entity information corresponding to this type of historical search query is to extract accessory names as entity information.

Those skilled in the art should be able to understand that the aforementioned descriptions of specific methods of extracting candidate entity information are merely examples. Other existing methods of extracting candidate entity information or those that may appear in the future, if applicable to the disclosure, should also fall within the scope of the disclosure.

In one embodiment, in step S3 of the method described FIG. 4, all candidate entity information corresponding to each historical search query is used as the entity information corresponding to the historical search query. Here, if the data amount of the candidate entity information is not too large and the candidate entity information is precise enough, all candidate entity information may be directly used as the entity information recommended to users without any screening. Such a mechanism reduces the data processing load and improves the recommendation speed.

In one embodiment, in step S1 of the method described FIG. 4, the method acquires search result information corresponding to each historical search query that includes text content, a website identifier, the number of supporters, and the number of opponents of an answer included within the text content of the web sites corresponding to the historical search query. Here, a web crawler may be employed to capture search result information corresponding to a historical search query that includes a knowledge requirement from community websites such as Baidu zhidao, SOSO wenda, and Taobao wenda. The captured search result information corresponding to the historical search query, such as web page data, is then analyzed. In addition to analyzing the text content of an answer of the web page data, information such as websites of the answer, the number of supporters, and the number of opponents can also be analyzed. The analysis will then be used for the subsequent extracting of the candidate entity information and grading of the candidate entity information. Examples of captured result data are shown in Table 1:

TABLE 1

| Query | Website | Text of answer | The number of supporters | The number of opponents |
|---|---|---|---|---|
| Presents for boyfriend | Website A | A scarf. When you give this to him, you should say "I want to keep you with me using this scarf because you're my life." | 2 | 0 |
| Presents for boyfriend | Website B | Giving presents to a man can indeed be a headache. You would never fall in love with a man who has nothing; but what can you offer to a man who has everything? Shirts, ties, belts, watches, and briefcases | 0 | 0 |
| Presents for boyfriend | Website C | Wallets, belts, and watches | 1 | 0 |

Those skilled in the art should be able to understand that the aforementioned descriptions of search result information are merely examples. Other existing search result information or search result information that may appear in the future, if applicable to the disclosure, should also fall within the scope of the disclosure and be incorporated herein by reference.

In one embodiment, in step S2 of the method described FIG. 4, the method extracts candidate entity information corresponding to the historical search query from the text content of an answer corresponding to each historical search query. After obtaining the search result information for each query, similar to the information shown in Table 1, a further step is to extract required candidate entity information from the search result information. Here, the candidate entity information corresponding to the historical search query may be extracted from the text content of an answer corresponding to each historical search query. Many methods of identifying candidate entity information from the text content of an answer are available, such as a rule-based method, a hidden Markov model-based method, and a conditional random field-based method, etc. Candidate entity information extracted from the text content of the answer may come in various forms. In a specific application scenario, for example, if it is to resolve a problem relating to a shopping query having a knowledge requirement and a screening of the category entities is necessary, the result of the candidate entity information may be presented as those shown in Table 2.

TABLE 2

| Query | Text of answer | Candidate entity information |
|---|---|---|
| Presents for boyfriend | A scarf. When you give this to him, you should say "I want to keep you with me using this scarf because you're my life." | Scarves |
| Presents for boyfriend | Giving present to a man can indeed be a headache. You would never fall in love with a man who has nothing; but what can you offer to a man who has everything? Shirts, ties, belts, watches, and briefcases | Shirts, ties, belts, watches, and briefcases |
| Presents for boyfriend | I sent wallets, belts, and watches to my boyfriend as gifts; for your information. | Wallets, belts, and watches |

In one embodiment of the method disclosed in FIG. 4, step S3 may further include substep S31 comprising: screening candidate entity information corresponding to each historical search query and selecting the entity information corresponding to the historical search query. Here, the candidate entity information may be checked and screened according to the historical search query to delete inaccurate candidate entity information or candidate entity information that is not accurate enough. Accurate candidate entity information is then selected to serve as entity information, thereby obtaining further optimized and more accurate entity information to be provided to the users.

In one embodiment, after step S3 of FIG. 4, the method further includes calculating a score for the candidate entity information corresponding to each historical search query. Here, after obtaining the search result information of each query, similar to the information shown in Table 1, and extracting the candidate entity information from the search result information, similar to that shown in Table 2, the candidate entity information may be further graded. The scores from the grading will be used for the subsequent screening of the entity information from the candidate entity information; or the screened entity information will be ranked and provided to the users. For example, Scores for the candidate entity information corresponding to each historical search query are provided in Table 3 as an example:

TABLE 3

| Query | Candidate entity information and scores thereof |
|---|---|
| Presents for boyfriend | Watches: 55; Wallets: 46; Lighters: 32; Waistbands: 22; Scarves: 22; Razors: 20; Bracelets: 18; Belts: 18; Ties: 18 . . . |
| Presents for celebrating the first month of a newborn baby | Longevity locks: 28; Milk powder: 28; Red envelope: 27; Bracelets: 16; Silver bracelets: 13; Cribs: 8; Silver locks: 7; Baby strollers: 7; Silver bracelets: 7; Diaper-related products: 7; Shoes: 6; Hats: 6; Diaper: 6 . . . |

Grading the candidate entity information is done by considering the obtained candidate entity information together with the website quality where the answer appears and the degree of support (weight) of the answer. Specifically, the degree of support is equal to the number of supporters less the number of opponents. In one embodiment, the scores for the candidate entity information corresponding to each historical search query may be calculated according to the following formula:

$$score_{entity1} = \sum_{i=1}^{m} \sum_{j=1}^{n} E_{ij} * Weight1_i * Weight2_j,$$

wherein entity1 denotes an entity word; m denotes the total number of websites; i denotes a web site from the m web sites; n denotes the total number of answers of a web site i; j denotes an answer from the n answers; $E_{ij}$ denotes whether entity 1 appears in the answer j from the website i, being 1 if entity1 appears and 0 if entity 1 is absent; $Weight1_i$ denotes a weight of the website i; $Weight2_j$ denotes a weight of the answer j; a value of the $Weight2_j$ being determined by the number of supporters and the number of opponents of the answer j; $Weight2_j$ being a positive integer greater than or equal to 1; and a default value of $Weight2_j$ being 1. For example, the value of $Weight2_j$ is obtained by subtracting the number of opponents from the number of proponents; and if the result of subtracting the number of opponents from the number of proponents is less than or equal to zero, the default value of Weight2j is 1. In the formula, $Weight1_i$ may be obtained through a preset process or obtained based on a page rank algorithm.

Those skilled in the art should be able to understand that the aforementioned description on the calculation of the scores for the candidate entity information corresponding to each historical search query is merely an example. Other existing methods or any that may appear in the future for calculating the scores for the candidate entity information corresponding to each historical search query, if applicable to the disclosure, should also fall within the scope of the disclosure and be incorporated herein by reference.

Accordingly, in step S31 of one embodiment of the disclosure, candidate entity information corresponding to each historical search query is screened and entity information corresponding to the historical search query is selected according to the scores for each piece of candidate entity information. Here, entity information having a higher score may be selected from the candidate entity information corresponding to each historical search query and be used as the entity information corresponding to the historical search query.

In one embodiment of the disclosure, after step S31, the method further includes obtaining, according to the scores for each piece of candidate entity information, a score for the selected corresponding entity information. Specifically, as shown in Table 3, the candidate entity information and scores thereof are "Watches: 55; Wallets: 46; Lighters: 32; Waistbands: 22; Scarves: 22; Razors: 20; Bracelets: 18; Belts: 18; Ties: 18"; and the entity information and scores after screening thereof are "Watches: 55; Wallets: 46; Lighters: 32; Waistbands: 22; Scarves: 22; Razors: 20". In other words, the saved candidate entity information and scores thereof are used as the selected entity information and scores thereof.

Acquiring the search result information, the candidate entity information, the entity information, and the scores involves large-scale data processing, requiring a large-scale parallel computation. In an embodiment of the disclosure, this computation may be implemented with a cloud computing platform.

Figure 8:
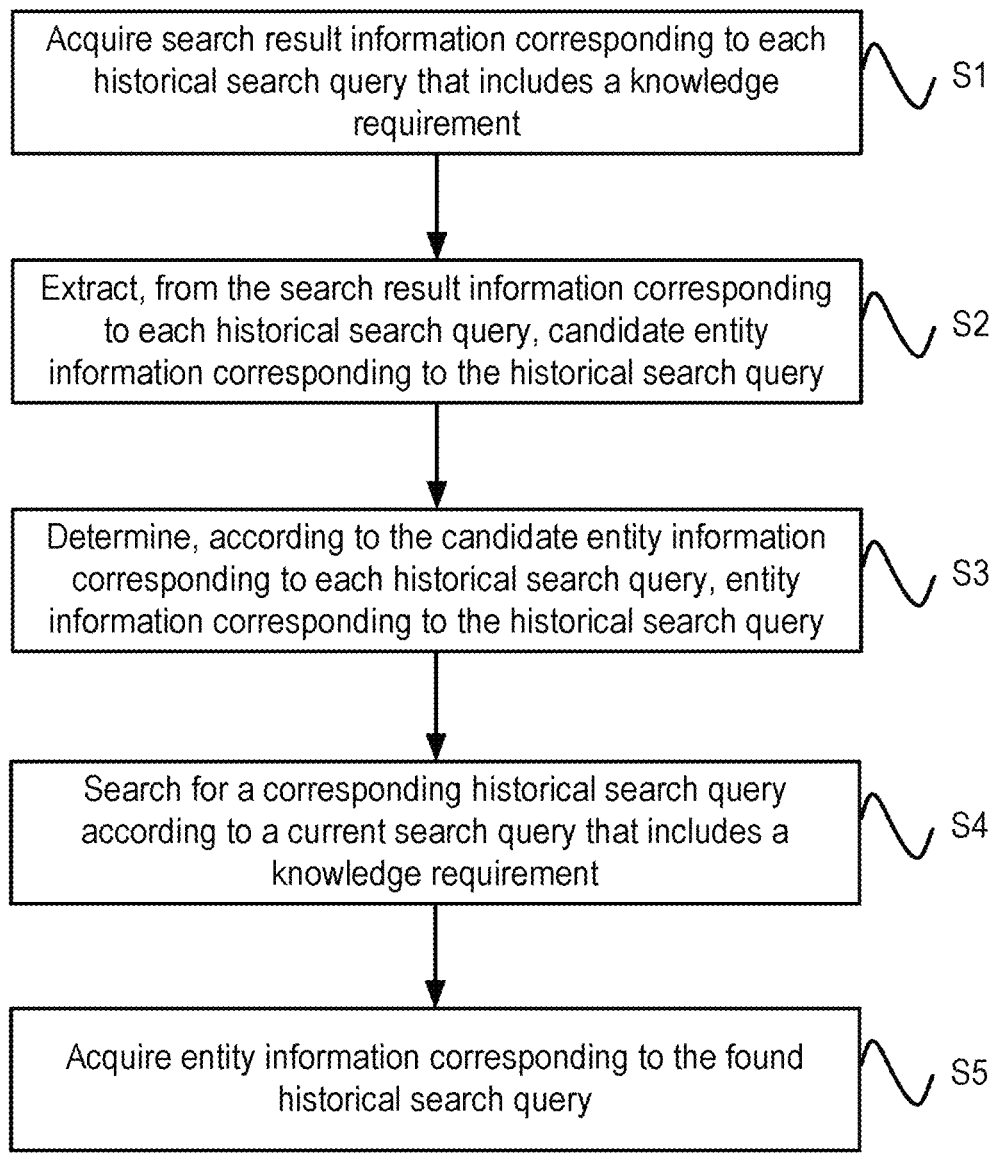
FIG. 8 is a flow diagram of a method for processing search data according to one embodiment of the disclosure.

FIG. 8 shows one embodiment of the disclosure in which after step S3, the method further includes:

Step S4: Search for a corresponding historical search query according to a current search query that includes a knowledge requirement; and Step S5: Acquire entity information corresponding to the found historical search query.

Here, the processes of step S4 and step S5 may be implemented with an online server. The historical search query and the corresponding entity information have been stored in a knowledge base in advance (as described supra). A user may submit a request to the online server via a terminal to search with a current search query that includes a knowledge requirement to find a corresponding historical search query. If the corresponding historical search query is found from the knowledge base, the online server directly presents the corresponding entity information as a label to users on a navigation area. The users may click the label to continue with a network operation, such as online shopping. In addition, the online server may divide the current search query that includes a knowledge requirement into multiple keyword sequences; and then search for the corresponding historical search query according to the multiple keyword sequences. The hit rate of the historical search query is then improved.

In one embodiment of the disclosure, after step S5 of FIG. 8, the method further includes acquiring scores for the entity information corresponding to the found historical search query; and ranking the entity information according to the scores for each piece of entity information. For example, entity information having a higher score may be presented at the top whereas entity information having a lower score may be put at the bottom. Users' efficiency in selecting entity information is then enhanced.

In one embodiment of the disclosure, the process of searching for the corresponding historical search query and corresponding entity information may be implemented using a key-value system that supports real-time queries.

Figure 9:
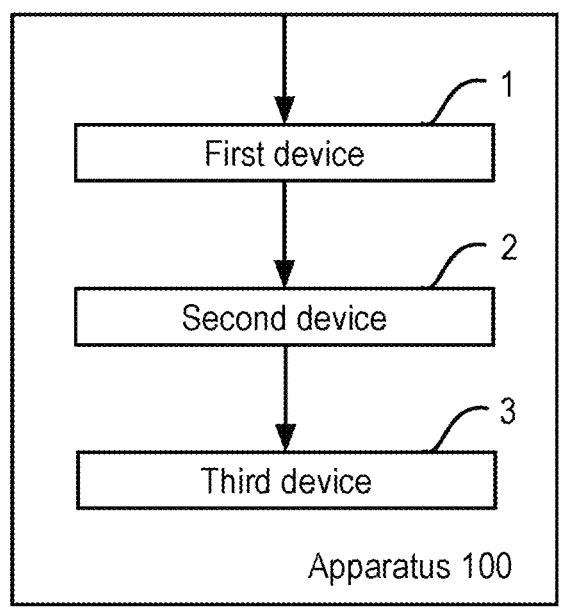
FIG. 9 is a diagram of an apparatus for processing search data according to one embodiment of the disclosure.

As shown in FIG. 9, according to another aspect of the disclosure, an apparatus 100 for processing search data is further provided, including:

a first device 1, configured to acquire search result information corresponding to each historical search query that includes a knowledge requirement;

a second device 2, configured to extract, from the search result information corresponding to each historical search query, candidate entity information corresponding to the historical search query; and a third device 3, configured to determine, according to the candidate entity information corresponding to each historical search query, entity information corresponding to the historical search query.

Specifically, for a historical search query that includes a knowledge requirement, the disclosure can mine entity information for the historical search query to serve as an answer recommended to a user. Thus, the accuracy of entity information recommended to the user is improved, and the current problem of a poor search result for a historical search query that includes a knowledge requirement is solved. The disclosure can employ an information extraction method in which a historical query that includes a knowledge requirement is identified first; then search result information related to the historical query including the knowledge requirement is extracted from community data; and desired entity information is mined from the search result information to serve as an answer storing to a knowledge base. Therefore, when a user conducts an online search for a corresponding historical search query according to a current search query that includes a knowledge requirement, entity information corresponding to the found historical search query may be recommended to the user based on the knowledge base.

In one embodiment, the entity information may be information about objects existing physically that can be distinguished from one another; the entity information may be information about a specific person, event, and object or about an abstract concept or relation. In a shopping application scenario, a historical search query that includes a knowledge requirement may be a shopping query for information, such as "a practical present for parents" in FIG. 5 or "a present for boyfriend" in FIG. 6. Through the method of the disclosure, entity information may be mined from community data of a web site to serve as an answer recommended to the users. Thus, the accuracy of the entity information recommended to the users is improved, such that the entity information obtained accordingly is recommended commodities tailor-made for the users, thereby solving the problem that the current shopping query that includes a knowledge requirement has poor shopping guide information. In another application scenario, users can obtain entity information of N levels in sequence, wherein N is a positive integer, and the next-level entity information is obtained depending on the previous-level entity information. For example, entity information obtained for the corresponding first (N−1) levels may be new historical search queries that include a knowledge requirement. In this way, entity information of the next level is obtained according to the previous-level historical search query. In addition to the $N^{th}$-level entity information, the next-level entity information can also be a historical search query. The further next-level entity information is obtained according to the next-level entity information, and so on, until a piece of specific entity information of the $N^{th}$ level, such as specific commodity information, is obtained according to the entity information of the $(N-1)^{th}$ level (which, at this point, is a historical search query). The entity information obtained corresponding to the first (N−1) levels may be presented to the users in a form of multi-level recommendation labels. When the user clicks on a recommendation label for a certain level, the user may be redirected to the next-level recommendation label until the specific entity information of the final $N^{th}$ level is obtained, such as the specific commodity information. Through this step-by-step redirecting manner, the user may be guided to obtain desired and specific entity information. Those skilled in the art should be able to understand that the aforementioned descriptions on application scenarios are merely examples. Other existing application scenarios or those that may appear in the future, if applicable to the disclosure, should also fall within the scope of the disclosure and be incorporated herein by reference.

Figure 10:
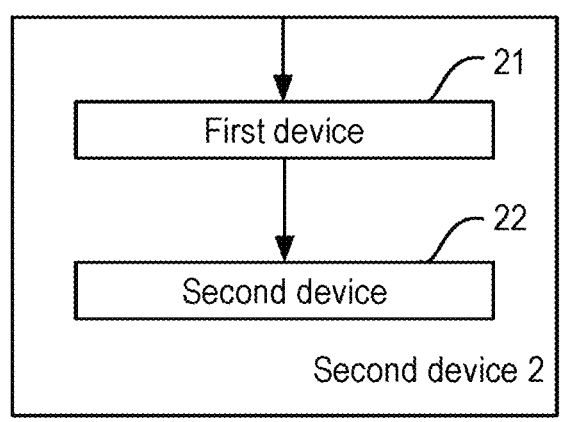
FIG. 10 is a diagram of an apparatus for processing search data according to one embodiment of the disclosure.

As shown in FIG. 10, in one embodiment of the disclosure, the second device 2 includes:

A first device 21, configured to determine, according to a type of each historical search query, a method of extracting candidate entity information corresponding to the historical search query; and A second device 22, configured to extract, according to the method of extracting candidate entity information corresponding to each historical search query, candidate entity information corresponding to the historical search query from the search result information corresponding to the historical search query.

Here, all the historical search queries may be analyzed and summarized first, followed by extracting different types of historical search queries including knowledge requirements. Then, the first device 21 determines, according to the types of each historical search query, a method of extracting candidate entity information corresponding to the historical search query. For example, the types of the historical search queries including knowledge requirements may be classified into the following:

(5) place name+"local products": indicating that it is hoped to acquire knowledge about local products for a specific location;

(6) "give" +title+"present": indicating that it is hoped to acquire shopping guide knowledge about giving presents;

(7) category word+"brand": indicating that it is hoped to acquire the best-selling brand of a category; and (8) category word+"accessory": indicating that it is hoped to acquire other accessories of a category.

For the historical search query of place name+"local product", it is determined that the method of extracting candidate entity information corresponding to this type of historical search query is to extract names of local products to serve as entity information. For the historical search query of "give" +title+"present", it is determined that the method of extracting candidate entity information corresponding to this type of historical search query is to extract present names as entity information. For the historical search query of category word+"brand", it is determined that the method of extracting candidate entity information corresponding to this type of historical search query is to extract brand names as entity information. For the historical search query of category word+"accessory", it is determined that the method of extracting candidate entity information corresponding to this type of historical search query is to extract accessory names as entity information. Those skilled in the art should be able to understand that the aforementioned description on the methods of extracting candidate entity information are merely examples. Other existing methods of extracting candidate entity information or those that may appear in the future, if applicable to the disclosure, should also fall within the scope of the disclosure and be incorporated herein by reference.

In one embodiment of the disclosure, a third device 3 is configured to use all the candidate entity information corresponding to each historical search query as the entity information corresponding to the historical search query. FIG. 4 shows one embodiment of the disclosure, wherein step S3 describes the following: all candidate entity information corresponding to each historical search query is used as the entity information corresponding to the historical search query. Here, if the data amount of the candidate entity information is not too large and the candidate entity information is precise enough, all candidate entity information may be directly used as the entity information recommended to users without any screening. Such a mechanism reduces data process load and improves the recommendation speed.

In one embodiment of the disclosure, the search result information corresponding to each historical search query acquired by the first device 1 includes text content, a website, the number of supporters, and the number of opponents of an answer corresponding to the historical search query. Here, a web crawler may be employed to capture search result information corresponding to a historical search query that includes a knowledge requirement from community websites such as Baidu zhidao, SOSO wenda, and Taobao wenda. The captured search result information corresponding to the historical search query, such as web page data, is then analyzed. In addition to analyzing the text content of an answer of the web page data, information such as websites of the answer, the number of supporters, and the number of opponents can also be analyzed. The analysis will then be used for the subsequent extracting of the candidate entity information and grading of the candidate entity information. Examples of captured result data are shown in Table 1:

TABLE 1

| Query | Website | Text of answer | Number of supporters | Number of opponents |
|---|---|---|---|---|
| Presents for boyfriend | Website A | A scarf. When you give this to him, you should say "I want to keep you with me using this scarf because you're my life." | 2 | 0 |
| Presents for boyfriend | Website B | Giving presents to a man can indeed be a headache. You would never fall in love with a man who has nothing; but what can you offer to a man who has everything? Shirts, ties, belts, watches, and briefcases | 0 | 0 |
| Presents for boyfriend | Website C | Wallets, belts, and watches | 1 | 0 |

Those skilled in the art should be able to understand that the aforementioned descriptions of search result information are merely examples. Other existing search result information or search result information that may appear in the future, if applicable to the disclosure, should also fall within the scope of the disclosure and be incorporated herein by reference.

Correspondingly, in one embodiment of the disclosure, the second device 2 extracts candidate entity information corresponding to the historical search query from the text content of the answer corresponding to each historical search query. After obtaining the search result information for each query, similar to the information shown in Table 1, a further step is to extract required candidate entity information from the search result information. Here, the candidate entity information corresponding to the historical search query may be extracted from the text content of an answer corresponding to each historical search query. Many methods of identifying candidate entity information from the text content of an answer are available, such as a rule-based method, a hidden Markov model-based method, and a conditional random field-based method, etc. Candidate entity information extracted from the text content of the answer may come in various forms. In a specific application scenario, for example, if it is to resolve a problem relating to a shopping query having a knowledge requirement and a screening of the category entities is necessary, the result of the candidate entity information may be presented as those shown in Table 2.

TABLE 2

| Query | Text of answer | Candidate entity information |
|---|---|---|
| Presents for boyfriend | A scarf. When you give this to him, you should say "I want to keep you with me using this scarf because you're my life." | Scarves |
| Presents for boyfriend | Giving presents to a man can indeed be a headache. You would never fall in love with a man who has nothing; but what can you offer to a man who has everything? Shirts, ties, belts, watches, and briefcases | Shirts, ties, belts, watches, and briefcases |
| Presents for boyfriend | I sent wallets, belts, and watches to my boyfriend as gifts; for your information. | Wallets, belts, and watches |

In one embodiment of the disclosure, the third device 3 screens candidate entity information corresponding to each historical search query and selects the entity information corresponding to the historical search query. Here, the candidate entity information may be checked and screened according to the historical search query to delete inaccurate candidate entity information or candidate entity information that is not accurate enough. Accurate candidate entity information is then selected to serve as entity information, thereby obtaining further optimized and more accurate entity information to be provided to the users.

Figure 11:
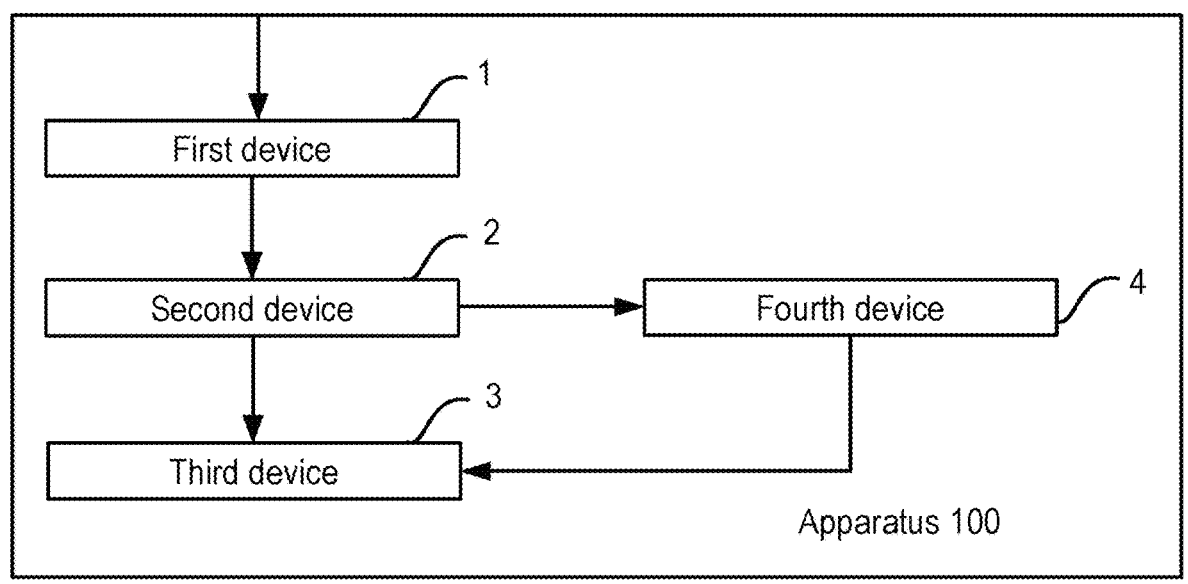
FIG. 11 is a diagram of an apparatus for processing search data according to one embodiment of the disclosure.

In one embodiment of the disclosure, as shown in FIG. 11, the apparatus further includes a fourth device 4, configured to calculate a score for the candidate entity information corresponding to each historical search query. Here, after obtaining the search result information of each query, similar to the information shown in Table 1, and extracting the candidate entity information from the search result information, similar to that shown in Table 2, the candidate entity information may be further graded. The scores from the grading will be used for the subsequent screening of the entity information from the candidate entity information; or the screened entity information will be ranked and provided to the users. For example, Scores for the candidate entity information corresponding to each historical search query are provided in Table 3 as an example:

TABLE 3

| Query | Candidate entity information and scores thereof |
|---|---|
| Presents for boyfriend | Watches: 55; Wallets: 46; Lighters: 32; Waistbands: 22; Scarves: 22; Razors: 20; Bracelets: 18; Belts: 18; Ties 18 . . . |
| Presents for celebrating the first month of a newborn baby | Longevity locks: 28; Milk powder: 28; Red envelope: 27; Bracelets: 16; Silver bracelets: 13; Cribs: 8; Silver locks: 7; Baby strollers: 7; Silver bracelets: 7; Diaper-related products: 7; Shoes: 6; Hats: 6; Diapers: 6 . . . |

Grading the candidate entity information is done by considering the obtained candidate entity information together with the website quality where the answer appears and the degree of support (weight) of the answer. Specifically, the degree of support is equal to the number of supporters less the number of opponents. In one embodiment, the fourth device 4 calculates the score for the candidate entity information corresponding to each historical search query according to the following formula:

$$score_{entity1} = \sum_{i=1}^{m} \sum_{j=1}^{n} E_{ij} * Weight1_i * Weight2_j,$$

wherein entity1 denotes an entity word; m denotes the total number of websites; i denotes a web site from the m web sites; n denotes the total number of answers of a web site i; j denotes an answer from the n answers; $E_{ij}$ denotes whether entity1 appears in the answer j from the website i, being 1 if entity 1 appears and 0 if entity1 is absent; $Weight1_i$ denotes a weight of the web site i; $Weight2_j$ denotes a weight of the answer j; a value of the $Weight2_j$ being determined by the number of supporters and the number of opponents of the answer j; $Weight2_j$ being a positive integer greater than or equal to 1; and a default value of $Weight2_j$ being 1. For example, the value of $Weight2_j$ is obtained by subtracting the number of opponents from the number of proponents; and if the result of subtracting the number of opponents from the number of proponents is less than or equal to zero, the default value of $Weight2_j$ is 1. In the formula, $Weight1_i$ may be obtained through a preset process or obtained based on a page rank algorithm.

Those skilled in the art should be able to understand that the aforementioned description on the calculation of the scores for the candidate entity information corresponding to each historical search query is merely an example. Other existing methods or any that may appear in the future for calculating the scores for the candidate entity information corresponding to each historical search query, if applicable to the disclosure, should also fall within the scope of the disclosure and be incorporated herein by reference.

In one embodiment of the disclosure, the third device 3 is configured to screen candidate entity information corresponding to each historical search query and select the entity information corresponding to the historical search query according to the scores for each piece of candidate entity information. Here, entity information having a higher score may be selected from the candidate entity information corresponding to each historical search query and be used as the entity information corresponding to the historical search query.

Further, in one embodiment of the disclosure, the third device 3 is further configured to obtain, according to the scores for each piece of candidate entity information, a score for the selected corresponding entity information. Specifically, as shown in Table 3, the candidate entity information and scores thereof are "Watches: 55; Wallets: 46; Lighters: 32; Waistbands: 22; Scarves: 22; Razors: 20; Bracelets: 18; Belts: 18; Ties: 18"; and the entity information and scores after screening thereof are "Watches: 55; Wallets: 46; Lighters: 32; Waistbands: 22; Scarves: 22; Razors: 20". In other words, the saved candidate entity information and scores thereof are used as the selected entity information and scores thereof.

Acquiring the search result information, the candidate entity information, the entity information, and the scores involves a large-scale data processing, requiring a large-scale parallel computation. In an embodiment of the disclosure, this computation may be implemented with a cloud computing platform.

Figure 12:
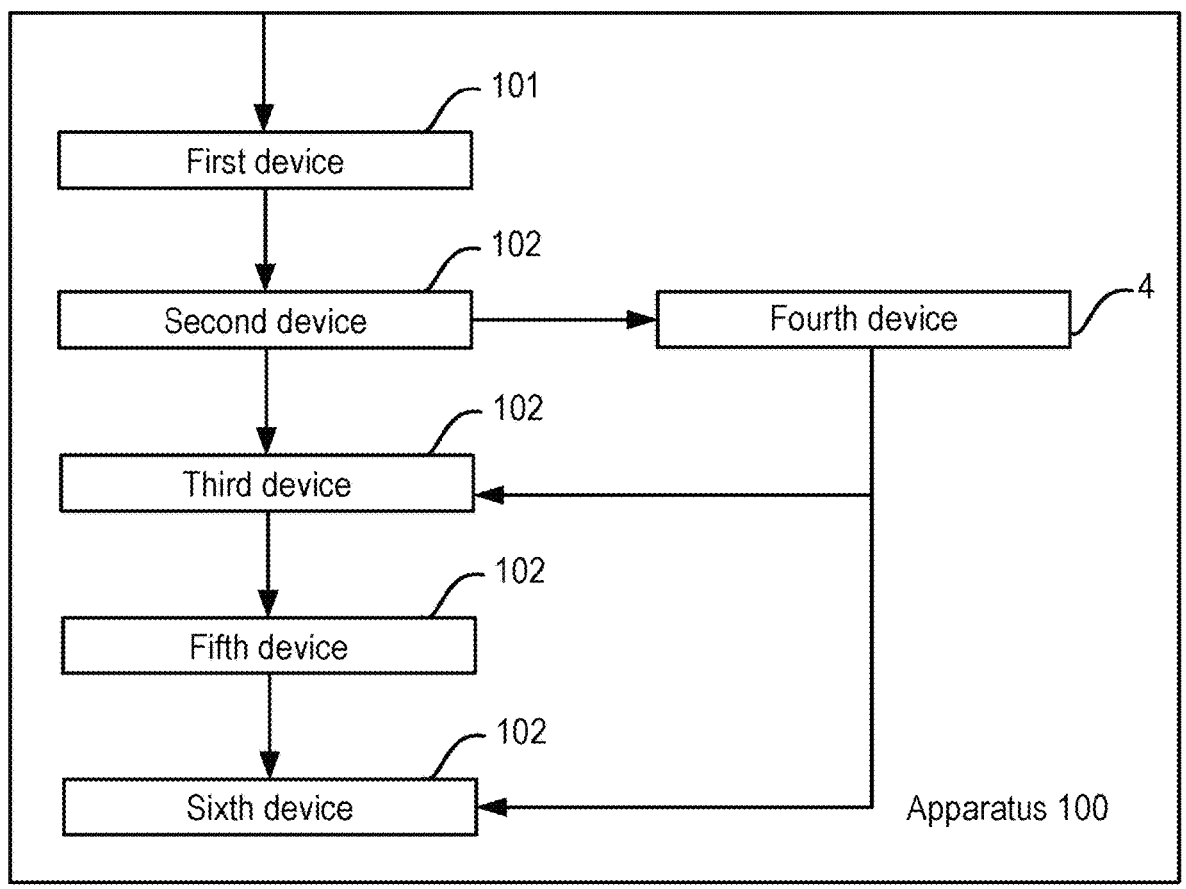
FIG. 12 is a diagram of an apparatus for processing search data according to one embodiment of the disclosure.

FIG. 12 shows one embodiment of the disclosure in which the apparatus further includes:

a fifth device 5, configured to search for a corresponding historical search query according to a current search query that includes a knowledge requirement; and a sixth device 6, configured to acquire entity information corresponding to the found historical search query. Here, the functions of the fifth device 5 and the sixth device 6 may be implemented with an online server. The historical search query and the corresponding entity information have been stored in a knowledge base in advance (as described supra). A user may submit a request to the online server via a terminal to search with a current search query that includes a knowledge requirement to find a corresponding historical search query. If the corresponding historical search query is found from the knowledge base, the online server directly presents the corresponding entity information in the format of a label to the user on a navigation area. The user may click the label to continue with a network operation, such as shopping. In addition, the online server may divide the current search query that includes a knowledge requirement into multiple keyword sequences; and then search for the corresponding historical search query according to the multiple keyword sequences. The hit rate of the historical search query is then improved.

Further, in one embodiment of the disclosure, the sixth device 6 is further configured to acquire scores for the entity information corresponding to the found historical search query; and ranking the entity information according to the scores for each piece of entity information. For example, entity information having a higher score may be presented at the top whereas entity information having a lower score may be put at the bottom. Users' efficiency in selecting entity information is then enhanced.

In an embodiment of the disclosure, the process of searching for the corresponding historical search query and corresponding entity information by the fifth device 5 and the sixth device 6 may be implemented using a key-value system that supports real-time queries.

The method and apparatus for processing search data described in the disclosure are further illustrated with reference made to specific application embodiments.

In a specific application scenario, to solve the problem of poor shopping guide information for a current shopping query with a knowledge requirement, search result information such as "website", "text of answer", "the number of supporters" and "the number of opponents" corresponding to a historical search query that has a knowledge requirement, such as "presents for boyfriend", as shown in Table 1 may be captured first from a community website such as Baidu zhidao, SOSO wenda, and Taobao wenda. Candidate entity information such as "shirts, ties, belts, watches, briefcases, pens" corresponding to the historical search query is extracted from the "text of answer" of the search result information of Table 1. Then, the candidate entity information may be graded respectively. The candidate entity information of "Shirts, ties, belts, watches, briefcases, pens" is screened according to scores thereof. For example, the score for pens is low so "pens" is then deleted; and entity information and scores after screening thereof are obtained, as those shown in Table 3. For example, entity information may be "shirts, ties, belts, watches, briefcases"; the entity information may be ranked afterwards according to the scores of "shirts, ties, belts, watches, briefcases". Entity information having a higher score is presented at the top, so that a user can easily see and select it, thus improving the accommodation accuracy rate.

In view of the above, for a historical search query that includes a knowledge requirement, the disclosure can mine entity information for the historical search query and use that as an answer recommended to users. Thus, the accuracy of entity information recommended to users is improved, and the current problem of a poor search result for a historical search query that has a knowledge requirement is solved.

Further, the disclosure screens candidate entity information corresponding to each historical search query and selects entity information corresponding to the historical search query. By screening and deleting inaccurate or less accurate candidate entity information, such a mechanism makes it possible to obtain the accurate candidate entity information and uses that as the entity information, thereby obtaining further optimized and more accurate entity information to be provided to users.

Further, the disclosure calculates scores for the entity information corresponding to each historical search query. Candidate entity information is screened and the entity information is selected according to the scores. Alternatively, the disclosure ranks the selected entity information and provides the entity information to users, thereby providing a more accurate recommendation result.

It is apparent that those skilled in the art can make various modifications and variations on the disclosure without departing from the spirit and scope of the disclosure. Therefore, if the modifications and variations of the disclosure fall within the scope of claims of the disclosure and equivalent technologies thereof, the disclosure is also intended to incorporate these modifications and variations.

It should be noted that the disclosure may be implemented in software and/or a combination of software and hardware, for example, an application specific integrated circuit (ASIC), a general-purpose computer or any other similar hardware devices can be used for implementing the disclosure. In one embodiment, a software program of the disclosure may be executed by a processor to achieve the steps or functions described above. Similarly, the software program (including a related data structure) of the disclosure can be stored into a computer readable recording medium, for example, a RAM memory, a magnetic or optical drive or a floppy disk and similar devices. In addition, some steps or functions of the disclosure may be implemented with hardware, for example, a circuit that performs various steps or functions in cooperation with the processor.

In addition, a part of the disclosure can be applied as a computer program product, for example, a computer program instruction, and when it is executed by a computer, the method and/or the technical solution according to the disclosure can be called or provided through operations of the computer. The program instruction that calls the method of the disclosure may be stored in a fixed or removable recording medium, and/or transmitted by means of broadcast or data streams in other signal bearer media, and/or stored in a working memory of a computer device that runs according to the program instruction. Herein, an embodiment according to the disclosure includes a device, the device including a memory configured to store a computer program instruction and a processor configured to execute the program instruction, wherein, when the computer program instruction is executed by the processor, the device is triggered to run the method and/or the technical solution based on the multiple embodiments of the disclosure.

To those skilled in the art, it is apparent that the disclosure is not limited to the details of the aforementioned exemplary embodiments, and the disclosure can be implemented in other specific forms without departing from the spirit or basic features of the disclosure. Therefore, in any way, the embodiments should be regarded as exemplary and non-restrictive; the scope of the disclosure is defined by the appended claims, instead of the above description, and therefore it is intended that the disclosure cover all variations falling into the meaning and scope of equivalent elements of the claims. No reference signs in the claims should be regarded as limiting the involved claims. Additionally, it is apparent that the term "include/comprise" does not exclude other units or steps, and singularity does not exclude plurality. A plurality of units or devices stated in a device claim may also be implemented by one unit or device through software or hardware. Terms such as first and second are used to indicate names, but do not indicate any particular sequence.

What is claimed is:

1. A method comprising:
    acquiring, by a processor, search result information associated with a historical search query, the historical search query including a knowledge requirement, the knowledge requirement including a shopping query for information and the search result information including text content and a website identifier, the text content comprising a number of supporters and a number of opponents of an answer to the shopping query;
    extracting, by the processor, candidate entity information from the search result information based on a type of the shopping query, wherein the candidate entity information corresponds to the historical search query associated with the search result information; and
    determining, by the processor, that a subset of the candidate entity information is entity information associated with the historical search query based on the search result information.

2. The method of claim 1, wherein acquiring search result information associated with a historical search query comprises:
    identifying a type of the historical search query based on text content included in the historical search query;
    identifying a method for extracting candidate entity information based on the type of the historical search query; and
    extracting candidate entity information using the method for extracting candidate entity information.

3. The method of claim 1, wherein extracting candidate entity information from the search result information comprises extracting candidate entity information from the answer included within the text content.

4. The method of claim 1, wherein extracting candidate entity information from the search result information further comprises screening the candidate entity information and selecting a subset of the candidate entity information.

5. The method of claim 4, wherein scoring the candidate entity information comprises scoring the candidate entity information based on a presence of an entity word appearing within an answer within text content of a website, a weight associated with the website, and a weight associated with the answer.

6. The method of claim 1, wherein extracting candidate entity information from the search result information further comprises scoring the candidate entity information and selecting, as the entity information, a highest scoring subset of the candidate entity information.

7. The method of claim 6, wherein the weight associated with the answer is determined based on a number of supporters of the answer and a number of opponents of the answer.

8. An apparatus comprising:
a processor; and
a non-transitory memory storing computer-executable instructions therein that, when executed by the processor, cause the apparatus to perform the operations of:
acquiring search result information associated with a historical search query, the historical search query including a knowledge requirement, the knowledge requirement including a shopping query for information and the search result information including text content and a web site identifier, the text content comprising a number of supporters and a number of opponents of an answer to the shopping query;
extracting candidate entity information from the search result information based on a type of the shopping query, wherein the candidate entity information corresponds to the historical search query associated with the search result information; and
determining that a subset of the candidate entity information is entity information associated with the historical search query based on the search result information.

9. The apparatus of claim 8, wherein acquiring search result information associated with a historical search query comprises:
identifying a type of the historical search query based on text content included in the historical search query;
identifying a method for extracting candidate entity information based on the type of the historical search query; and
extracting candidate entity information using the method for extracting candidate entity information.

10. The apparatus of claim 9, wherein identifying a type of the historical search query based on text content included in the historical search query comprises identifying a presence of one or more pre-defined n-grams or patterns.

11. The apparatus of claim 8, wherein extracting candidate entity information from the search result information comprises extracting candidate entity information from the answer included within the text content.

12. The apparatus of claim 8, wherein extracting candidate entity information from the search result information further comprises screening the candidate entity information and selecting a subset of the candidate entity information.

13. The apparatus of claim 12, wherein scoring the candidate entity information comprises scoring the candidate entity information based on a presence of an entity word appearing within an answer within text content of a website, a weight associated with the website, and a weight associated with the answer.

14. The apparatus of claim 8, wherein extracting candidate entity information from the search result information further comprises scoring the candidate entity information and selecting, as the entity information, a highest scoring subset of the candidate entity information.

15. The apparatus of claim 14, wherein the weight associated with the answer is determined based on a number of supporters of the answer and a number of opponents of the answer.

16. A non-transitory memory storing computer-executable instructions therein that, when executed by the processor, cause the apparatus to perform the operations of:
acquiring, by a processor, search result information associated with a historical search query, the historical search query including a knowledge requirement, the knowledge requirement including a shopping query for information and the search result information including text content and a website identifier, the text content comprising a number of supporters and a number of opponents of an answer to the shopping query;
extracting, by the processor, candidate entity information from the search result information based on a type of the shopping query, wherein the candidate entity information corresponds to the historical search query associated with the search result information; and
determining, by the processor, that a subset of the candidate entity information is entity information associated with the historical search query based on the search result information.

17. The non-transitory memory of claim 16, further comprising:
receiving, by the processor over a network, a current search query from a user, the current search query including the knowledge requirement;
identifying, by the processor, the historical search query as corresponding to the current search query; and
transmitting, by the processor over the network, the entity information corresponding to the historical search query to the user in a response to the current search query.

* * * * *